(12) United States Patent
Otani

(10) Patent No.: US 8,997,808 B2
(45) Date of Patent: Apr. 7, 2015

(54) MOTORCYCLE TIRE

(75) Inventor: Masafumi Otani, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 812 days.

(21) Appl. No.: 13/227,635

(22) Filed: Sep. 8, 2011

(65) Prior Publication Data

US 2012/0060988 A1    Mar. 15, 2012

(30) Foreign Application Priority Data

Sep. 9, 2010   (JP) ................. 2010-202345

(51) Int. Cl.
*B60C 11/117*   (2006.01)
*B60C 11/03*    (2006.01)

(52) U.S. Cl.
CPC ......... *B60C 11/0304* (2013.01); *B60C 11/0311* (2013.01); *B60C 11/0332* (2013.01); *B60C 11/033* (2013.01); *B60C 2200/10* (2013.01); *B60C 2011/0381* (2013.01); *B60C 2011/0365* (2013.01); *B60C 2011/0374* (2013.01); *B60C 2011/0025* (2013.01)

(58) Field of Classification Search
CPC  B60C 11/03; B60C 11/0302; B60C 11/0304; B60C 11/032; B60C 2200/10; B60C 2200/12; B60C 2200/14; B60C 2011/0358; B60C 2011/0372; B60C 2011/0374; B60C 2011/0381; B60C 2011/0383; B60C 11/13

USPC ............... 152/209.28, 209.11, 209.18, 209.8, 152/903, 904, 209.1, 209.16, 209.17; D12/535, 570

See application file for complete search history.

(56) References Cited

U.S. PATENT DOCUMENTS 6,776,204 B2 *   8/2004   Cesarini et al. ............ 152/209.8
2007/0102083 A1   5/2007   Hayashi

FOREIGN PATENT DOCUMENTS

EP            2181864       *  5/2010
WO    WO 2009/060481       *  5/2009

* cited by examiner

*Primary Examiner* — Eric Hug
(74) *Attorney, Agent, or Firm* — Birch, Stewart, Kolasch & Birch, LLP

(57) ABSTRACT

A motorcycle tire has a unidirectional tread pattern having an intended rotational direction. The tread portion is provided on each side of the tire equator with main oblique grooves, each comprising a main portion extending from the tire equator toward a tread edge while inclining toward the direction opposite to the intended rotational direction. The main portion includes a part overlapping the tire equator which part has an inclination angle of not more than 20 degrees with respect to the tire equator. The main portion has such a dimension that the circumferential ends thereof are positioned outside a ground contacting area of the tire in its normally inflated loaded state at the camber angle of 0 degree. The land ratio of a tread center region between the ground contact edges is in a rage of from 75 to 95%.

12 Claims, 8 Drawing Sheets

US 8,997,808 B2

MOTORCYCLE TIRE

BACKGROUND OF THE INVENTION

The present invention relates to a pneumatic tire, more particularly to a tread pattern of a motorcycle tire suitable for street use which can improve the rolling resistance.

In recent years, in view of the global environment issues, a motorcycle tire having less rolling resistance is receiving increasing attention in order to decrease the fuel consumption similarly to automobile tires.

Japanese patent application publication JP-A-2007-131112 (US-2007-102083-A1) discloses a motorcycle tire whose tread center region is made of a low hysteresis loss rubber having a small loss tangent so that the heat generation and energy loss in the tread center region is decreased to thereby improve the rolling resistance. In such motorcycle tire, however, there is a tendency that the road grip performance is impaired due to the low hysteresis loss rubber disposed in the tread center region and it is difficult to improve the steering stability.

Also the rolling resistance can be decreased by using a high modulus rubber in the tread center region. In this case, however, there is a problem such that the ride comfort is considerably deteriorated. Further, the road grip performance is also deteriorated.

SUMMARY OF THE INVENTION

It is therefore, an object of the present invention to provide a motorcycle tire, in which the rolling resistance can be improved without sacrificing other performance such as road grip, steering stability, ride comfort and the like.

According to the present invention, a motorcycle tire has an intended rotational direction and comprises a tread portion provided on each side of the tire equator with main oblique grooves, wherein each of the main oblique grooves comprises a main portion extending from the tire equator toward a tread edge while inclining toward the direction opposite to the intended rotational direction, the main portion includes a part overlapping the tire equator which part has an inclination angle of not more than 20 degrees with respect to the tire equator, the main portion has such a dimension that the circumferential ends thereof are positioned outside a ground contacting area of the tire in a normally inflated loaded state of the tire at the camber angle of 0 degree, when the circumferential center of the maximum circumferential length of the ground contacting area is coincided with the center of the circumferential range of a part of the tire equator overlapping with the main portion, and the tread portion is provided between the ground contact edges with a land ratio of from 75 to 95%, wherein the ground contact edges are the axially outermost edges of the ground contacting area.

Therefore, the part of the main portion of the main oblique groove overlapping with the tire equator can decrease the tread rubber volume in the vicinity of the tire equator. As a result, the tread portion can flexibly follow out-of-plane bending deformation occurring when contacting with the ground. Especially, in the ground contacting area, the part of the main portion overlapping with the tire equator is deformed so as to decrease the groove width. As a result, the ground contacting width of the tire is increased and the ground contacting area is increased. In such conditions, as the land ratio is limited in a specific range, the ground pressure is dispersed and lowered. Accordingly, the energy loss occurring in the ground contacting area during straight running is decreased, and the rolling resistance can be improved.

Further, the dimension of the main portion is set such that the ends thereof are positioned outside the ground contacting area, therefore, water film on the road surface can be effectively eliminated from the ground contacting area, and the drainage performance can be improved.

These advantages can be obtained without using a low hysteresis loss rubber or a high elastic modulus rubber in the tread portion, therefore, the deteriorations of the steering stability and ride comfort due to the use of such rubber can be avoided.

In this application including specification and claims, various dimensions, positions and the like of the tire refer to those under a normally inflated unloaded condition of the tire unless otherwise noted.

The normally inflated unloaded state is such that the tire is mounted on a standard wheel rim and inflate to a standard pressure but loaded with no tire load.

The normally inflated loaded state is such that the tire is mounted on the standard wheel rim and inflate to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

BRIEF DESCRIPTION OF THE DRAWINGS

FIG. 5(*b*) shows the ground contacting area of the motorcycle tire.

DESCRIPTION OF THE PREFERRED EMBODIMENTS

Figure 1:
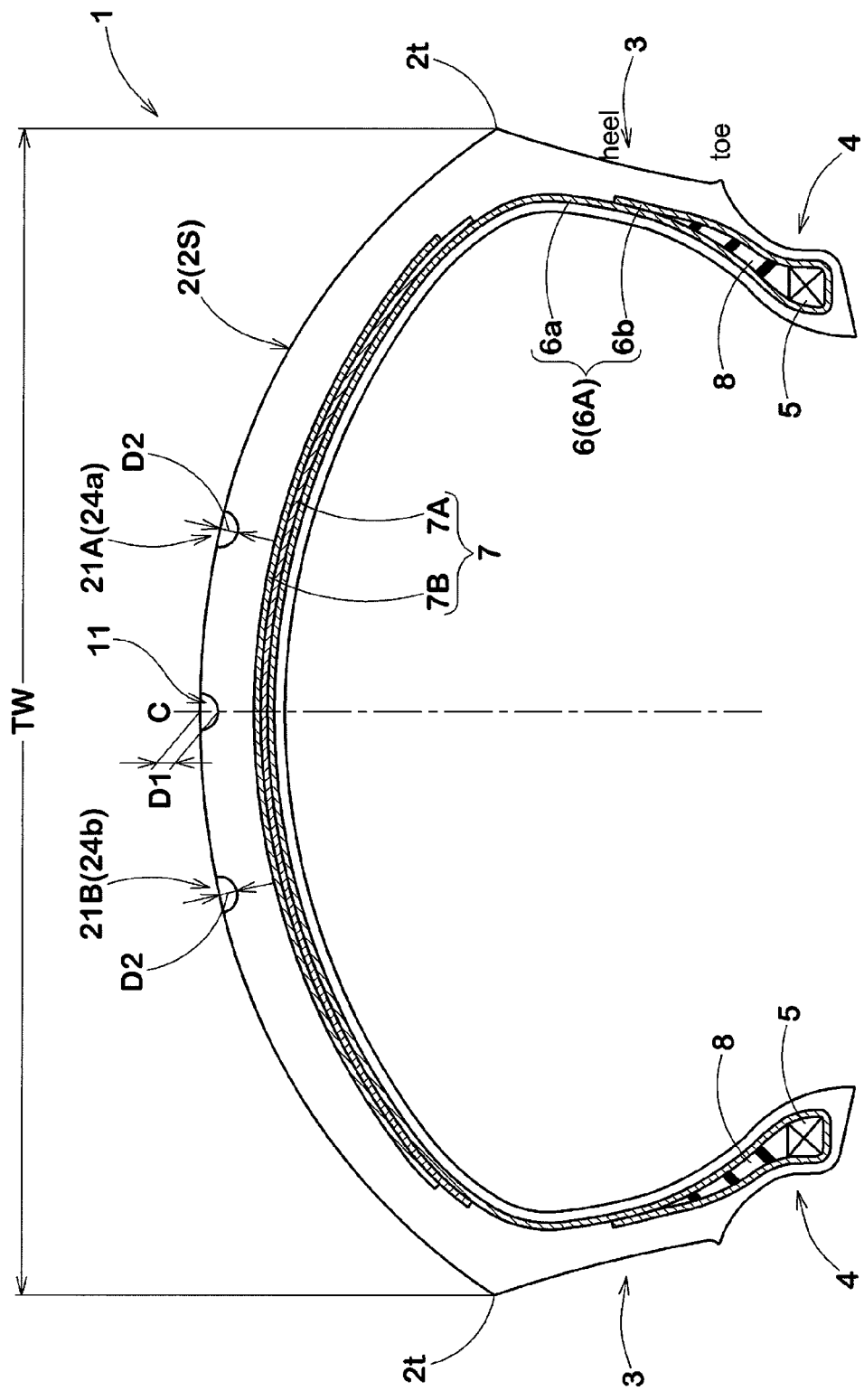
FIG. 1 is a cross sectional view of a motorcycle tire according to an embodiment of the present invention.

Embodiments of the present invention will now be described in detail in conjunction with the accompanying drawings.

In the drawings, motorcycle tire 1 according to the present invention comprises a tread portion 2 having tread edges 2t (2ta and 2tb), a pair of bead portions 4 with a bead core 5 therein, a pair of sidewall portions 3 extending between the tread edges and bead portions, a carcass 6 extending between the bead portions 4 through the tread portion 2 and sidewall portions 3, and a tread reinforcing layer 7 disposed radially outside the carcass 6 in the tread portion 2.

The tread portion 2 is curved convexly so that the maximum cross section width TW of the tire lies between the tread edges 2t as shown in FIG. 1.
The tread portion 2 is provided with a unidirectional tread pattern having an intended tire rotational direction R.
The tread pattern is designed for street use.

The carcass 6 is composed of one or more, in this example, only one ply 6A of carcass cords extending between the bead portions 4 through the tread portion 2 and sidewall portions 3 and turned up around the bead core 5 in each of the bead portions 4 from the inside to the outside of the tire so as to form a pair of carcass ply turned up portions 6b and a carcass ply main portion 6a therebetween.
The carcass cords of the carcass ply 6A are arranged radially at an angle of from 75 to 90 degrees, more preferably 80 to 90 degrees with respect to the tire equator c.
As to the carcass cords, organic fiber cords, e.g. nylon, polyester, rayon and the like are suitably used.

Meanwhile, between the carcass ply main portion 6a and turned up portion 6b in each of the bead portions, there is disposed a bead apex 8 made of a hard rubber compound extending radially outwardly from the radially outside of the bead core 5 in order to reinforce the bead portion 4 and a sidewall lower portion.

The above-mentioned tread reinforcing layer 7 is composed of one or more, in this example, two cross plies 7A and 7B of reinforcing cords laid at an inclination angle of from 5 to 40 degrees with respect to the tire equator C.
As to the reinforcing cords, for example, steel cords, aramid cords or rayon cords are suitably used.

The tread portion 2 is provided with tread grooves to define the above-mentioned unidirectional tread pattern.

Figure 2:
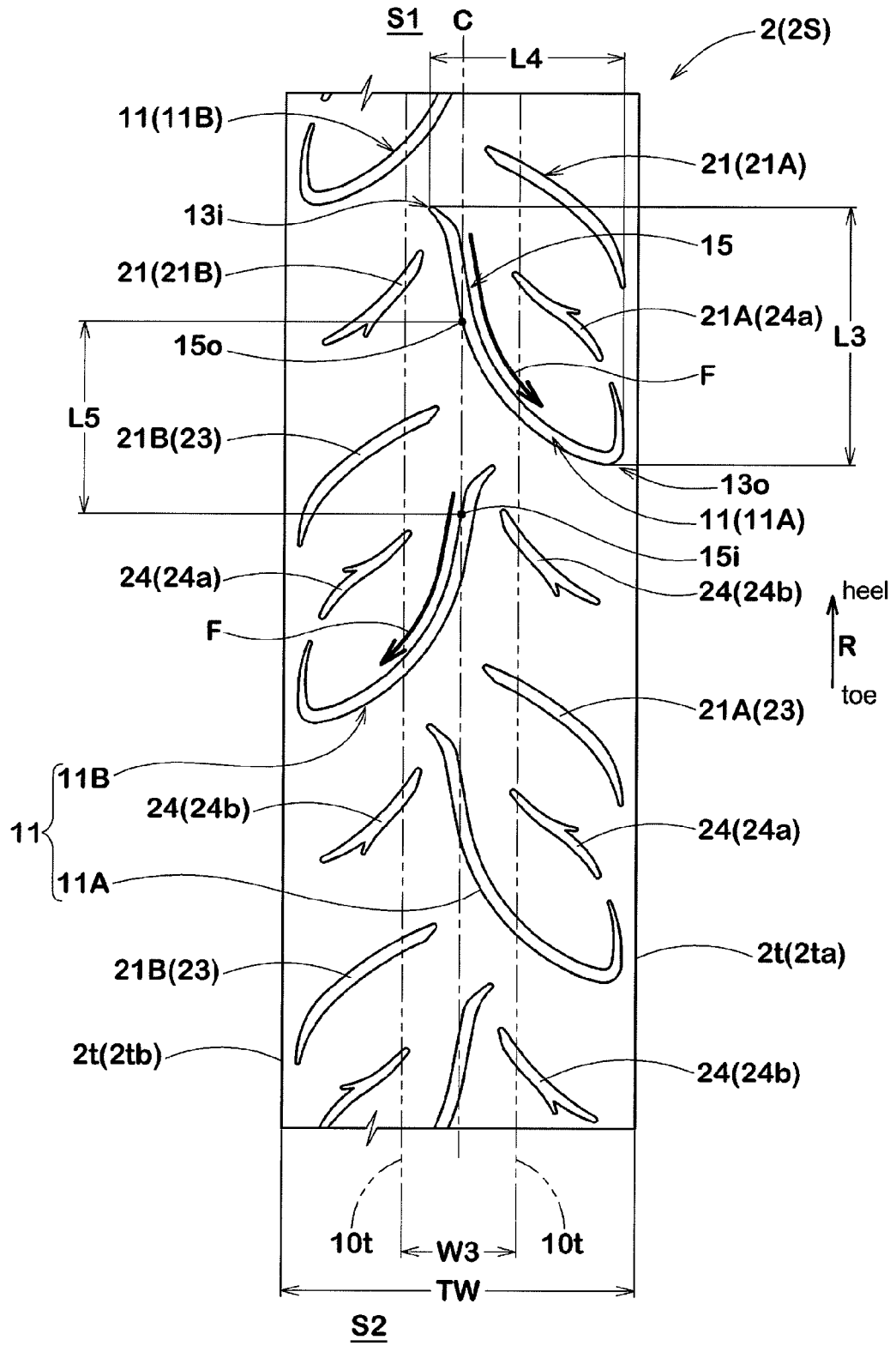
FIG. 2 is a developed partial view of the tread portion thereof showing an example of the unidirectional tread pattern according to the present invention.

The tread grooves include a plurality of main oblique grooves 11 arranged circumferentially of the tire at intervals without being connected with each other as shown in FIG. 2. The main oblique groove 11 has a maximum groove width W1 of about 6.5 to 10.0 mm and a maximum groove depth D1 of about 6.0 to 8.0 mm.

In this embodiment, the tread grooves further include auxiliary oblique grooves 21. The auxiliary oblique groove 21 has a maximum groove width W5 of from 6.5 to 10.0 mm, and a maximum groove depth D2 of from 6.0 to 8.0 mm.

The main oblique grooves 11 include 1st and 2nd main oblique grooves 11A and 11B alternately arranged in the tire circumferential direction. The 1st main oblique groove 11A extends from a position near the tire equator C towards one tread edge 2ta and is located mainly on one side of the tire equator (right-hand side). The 2nd main oblique grooves 11B extends from a position near the tire equator C towards the other tread edge 2tb and is located mainly on the other side of the tire equator (left-hand side). The shape of the 1st main oblique groove 11A and the shape of the 2nd main oblique grooves 11B are symmetrical about the tire equator.

Figure 3:
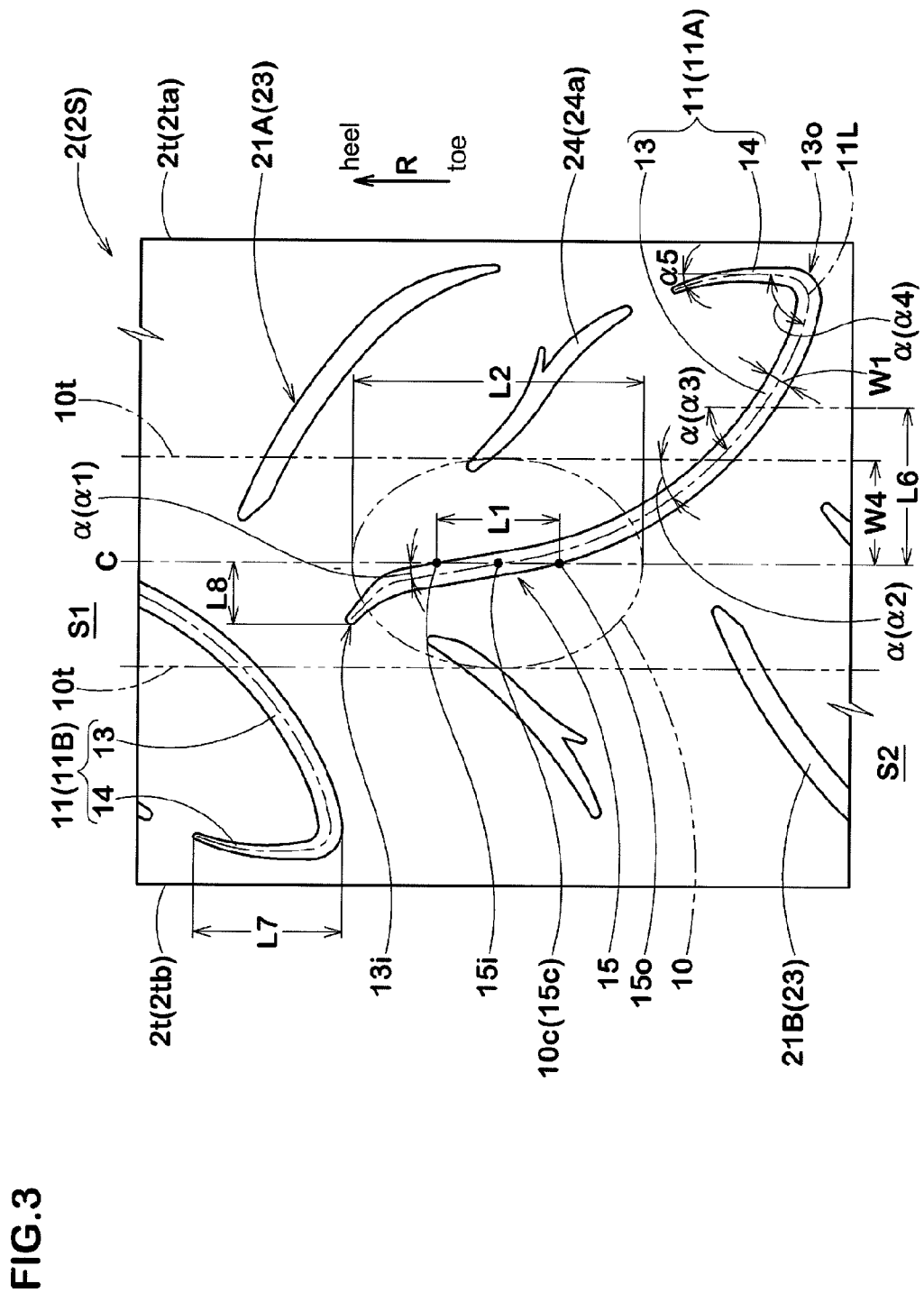
FIG. 3 is a developed partial view of the tread portion showing the main oblique groove.

The main oblique groove 11 comprises a main portion 13 and a sub portion 14, and there is a turning point between the main portion 13 and sub portion 14. As a result, the main oblique groove 11 has a hook shape as shown in FIG. 3.

The main portion 13 extends from the tire equator C to its heel-side end 13i positioned near the tire equator C on one side of the tire equator C and also extends from the tire equator C towards and axially outwardly beyond the ground contact edge 10t positioned on the other side of the tire equator C. The toe-side end 13o of the main portion 13 is positioned near the tread edge 2t.

Here, the ground contact edge 10t is a circumferentially continuously extending edge line corresponding to the axially outermost edge of the ground contacting area 10 (corresponding to the footprint) of the tire in the normally inflated loaded state of the tire at the camber angle of 0 degree.

The main portion 13 accordingly has a part 15 overlapping with the tire equator C (hereinafter the on-the-EQ-part 15).

The sub portion 14 extends in the tire circumferential direction from the toe-side end 13o of the main portion 13 toward the intended tire rotational direction R.
The turning point is positioned near the tread edge 2t.

The angle $\alpha$ of the widthwise center line 11L of the main oblique groove 11 with respect to the circumferential direction is as follows.

From the tire equator C to the heel-side end 13i of the main portion 13, the angle $\alpha$ is gradually increased.
From the tire equator C to the ground contact edge 10t, the angle $\alpha$ is gradually increased.
From the ground contact edge 10t to the toe-side end 13o of the main portion 13, the angle $\alpha$ is gradually increased.
Therefore, at the tire equator, the curvature is reversed, and the main portion 13 is smoothly curved.

The angle $\alpha_1$ at the tire equator C is set in a range of from 0 to 20 degrees.
The angle $\alpha_2$ at the ground contact edge 10t is preferably set in a range of not less than 30 degrees, more preferably not less than 35 degrees, but not more than 60 degrees, more preferably not more than 55 degrees. If the angle $\alpha_2$ is less than 30 degrees or more than 60 degrees, the transient characteristic from straight running to cornering is deteriorated and the steering stability is deteriorated.

The angle $\alpha_4$ at the toe-side end 13o is preferably set in a range of not less than 70 degrees, more preferably not less than 75 degrees, but not more than 105 degrees, more preferably not more than 100 degrees.
The angle $\alpha_3$ at a position spaced apart from the tire equator C toward the toe-side end 13o by a distance L6 is preferably set in a range of not less than 30 degrees, more preferably not less than 40 degrees, but not more than 70 degrees, more preferably not more than 60 degrees, wherein the distance L6 is 1.5 times one half (W4) of the ground contacting width W3. Here, the ground contacting width W3 is the width between the ground contact edges 10t.

In the on-the-EQ-part 15 (in a circumferential range L1 shown in FIG. 3), the angle $\alpha$ is set in a range of from 0 to 20 degrees, preferably not more than 10 degrees in order to reduce the tread rubber volume in the vicinity of the tire equator C. (The circumferential range L1 of the on-the-EQ-part 15 is equal to the length of a part of the tire equator C overlapping with the main portion 13.)

Further, the angle $\alpha_5$ in the sub portion 14 is set in a range of from 0 to 20 degrees. In this example, the angle $\alpha_5$ gradually increases from the toe-side end to the heel-side end of the sub portion 14 so that the sub portion 14 is slightly curved toward the tire equator C.

As to the dimension of the main portion 13, when the center 15c of the circumferential range L1 of the on-the-EQ-part 15 is coincided with the circumferential center 10c of the maximum circumferential length L2 of the ground contacting area 10, both of the ends 13i and 13o of the main portion 13 are positioned outside the ground contacting area 10. In other words, the main portion 13 extends across the ground contacting area 10 passing through the circumferential center 10c of ground contacting area 10 (corresponding to the footprint at a certain moment). And at least between the tire equator and the ground contact edge 10t, the groove width W1 of the main portion 13 is substantially constant.

Figure 5A:
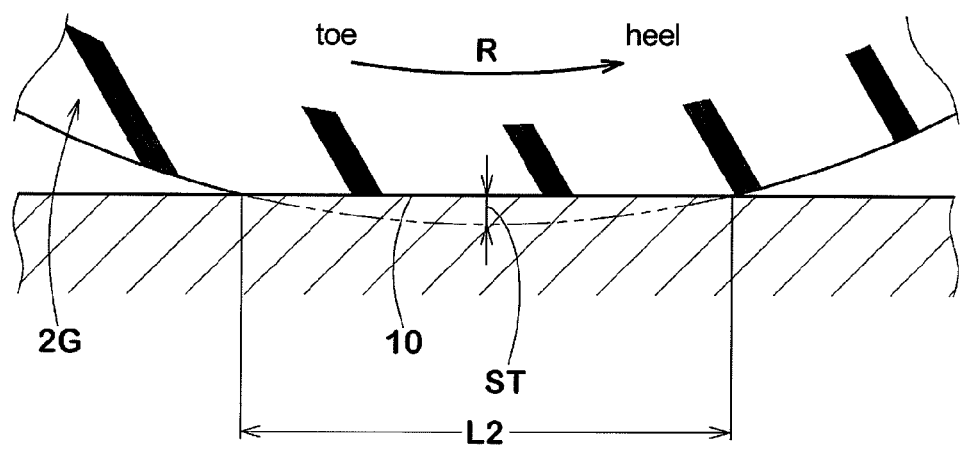
FIG. 5(*a*) is a schematic cross sectional view of the motorcycle tire taken along the tire equatorial plane showing a ground contacting state.
Figure 5B:
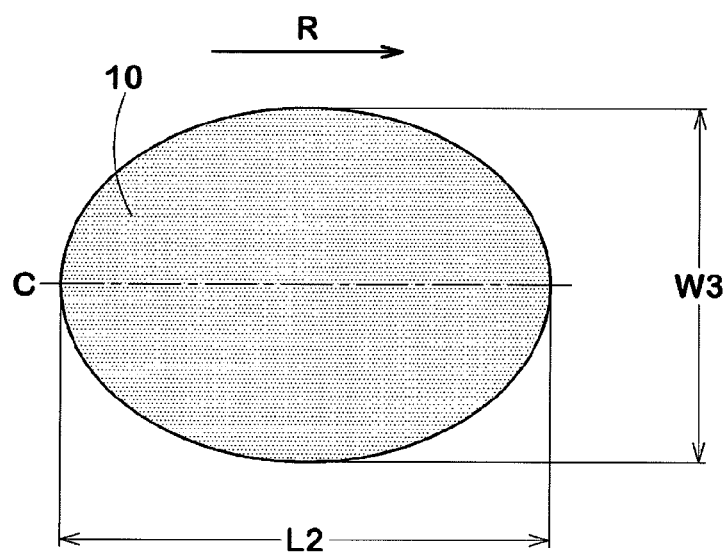

Such main oblique grooves 11 can decrease the tread rubber volume in the vicinity of the tire equator C owing to its on-the-EQ-part 15. As a result, the tread portion 2 can flexibly follow out-of-plane bending deformation occurring when contacting with the ground. As shown in FIG. 5, in the ground contacting area 10 during straight running, due to the compressive deformation of the on-the-EQ-part 15, the ground contacting width W3 is increased and the ground contacting area 10 during straight running is increased. At the same time, the maximum circumferential length L2 of the ground contacting area 10 is decreased. Further, as the land ratio between the ground contact edges 10t is limited in a range of from 75 to 95%, the ground pressure is dispersed and lowered. Accordingly, the distortion ST of the tread rubber 2G in the ground contacting area is controlled, and the rolling resistance can be further improved.

Further, as show in FIG. 3, during rolling, the ends 13i and 13o of the main portion 13 can positioned outside the ground contacting area 10, therefore, water film on the road surface can be effectively eliminated from the ground contacting area 10, and the drainage performance can be improved.

Such effects can be obtained without using a low hysteresis loss rubber or a high elastic modulus rubber in the tread portion 2, therefore, the deteriorations of the steering stability and ride comfort due to the use of such rubber can be avoided.

Further, as the angle α of the main portion 13 is gradually increased, the drainage can be improved.

Furthermore, during cornering, the sub portions 14 can eliminate water film on the road surface, and the drainage performance during cornering can be improved.

In order to effectively reduce the energy loss in a tread central region between the ground contact edges 10t and obtain good drainage, the land ratio of the tread central region is set in a range of not less than 75%, preferably not less than 80%, but not more than 95%, preferably not more than 90%. Here, the tread central region corresponds to the ground contacting part during straight running.

As well known, the land ratio means a ratio of the ground contacting area of the part concerned to the gross area of the part concerned including the grooved area.

The above-mentioned circumferential range L1 of the on-the-EQ-part 15 is preferably set in a range of not less than 0.2 times, more preferably not less than 0.4 times, but not more than 1.0 times, more preferably not more than 0.8 times the maximum circumferential length L2 of the ground contacting area 10. If the circumferential range L1 is less than 0.2 times the maximum circumferential length L2, there is a possibility that the decrease in the rubber volume in the vicinity of the tire equator C becomes insufficient for fully improving the rolling resistance. If more than 1.0 times, there is a possibility that the land ratio between the ground contact edges 10t decreases and the steering stability is deteriorated.

As shown in FIG. 2, the circumferential distance L3 between the ends 13i and 13o of the main portion 13 is preferably set in a range of not less than 0.8 times, more preferably not less than 1.5 times, but not more than 2.0 times the maximum circumferential length L2 of the ground contacting area 10. If the circumferential distance L3 is less than 0.8 times the maximum circumferential length L2, there is a possibility that water film on the road surface can not be effectively removed and the drainage performance is deteriorated. If more than 2.0 times, there is a possibility that the uneven wear resistance and the transient characteristic are deteriorated.

The axial distance L4 between the ends 13i and 13o of the main portion 13 is preferably set in a range of not less than 4.0 times, more preferably not less than 4.5 times one half (W4) of the ground contacting width W3 for the similar reasons to the circumferential distance L3.

The circumferential distance L5 between the circumferentially adjacent main oblique grooves 11 measured at the tire equator c (namely between the points 15i and 15o) is preferably set in a range of not less than 0.9 times, more preferably not less than 1.0 times, but not more than 1.5 times, more preferably not more than 1.4 times the maximum circumferential length L2 of the ground contacting area 10. If the distance L5 at the tire equator C is less than 0.9 times the maximum circumferential length L2, there is a possibility that the straight running stability is deteriorated. If the distance L5 is more than 1.5 times, there is a possibility that the drainage performance is deteriorated.

The circumferential length L7 of the sub portion 14 is preferably set in a range of not less than 0.15 times, more preferably not less than 0.2 times, but not more than 0.4 times, more preferably not more than 0.35 times the circumferential distance L3 between the ends 13i and 13o of the main portion 13. If the circumferential length L7 is less than 0.15 times the circumferential distance L3, there is a possibility that drainage performance during cornering can not be fully improved. If more than 0.35 times, there is a possibility that the tread rubber volume decreases near the tread edge 2t and the cornering grip performance is deteriorated.

The axial distance L8 of the heel-side end 13o of the main portion 13 from the tire equator C is set in a range of not less than 0.45 times, preferably not less than 0.5 times, but not more than 1.0 times, preferably not more than 0.95 times one half (W4) of the ground contacting width W3.

If the axial distance L8 is less than 0.45 times W4, it becomes difficult to fully improve the drainage performance. If more than 1.0 times, the heel-side ends 13i get close to the adjacent main oblique grooves 11 and there is a possibility that the transient characteristic is deteriorated.

The above-mentioned auxiliary oblique groove 21 also inclines to the direction opposite to the intended tire rotational direction R from its axially inner end to its axially outer end. In order to increase the drainage without further decreasing the tread rubber volume in the vicinity of the tire equator C, the auxiliary oblique grooves 21 are not overlapped with the tire equator C, and the axially inner ends are spaced apart from the tire equator.

The auxiliary oblique grooves 21 include 1st auxiliary oblique grooves 21A and 2nd auxiliary oblique grooves 21B arranged alternately in the circumferential direction. The 1st auxiliary oblique grooves 21A are disposed on one side of the tire equator (right-hand side). The 2nd auxiliary oblique grooves 21B are disposed on the other side of the tire equator (left-hand side).

Figure 4:
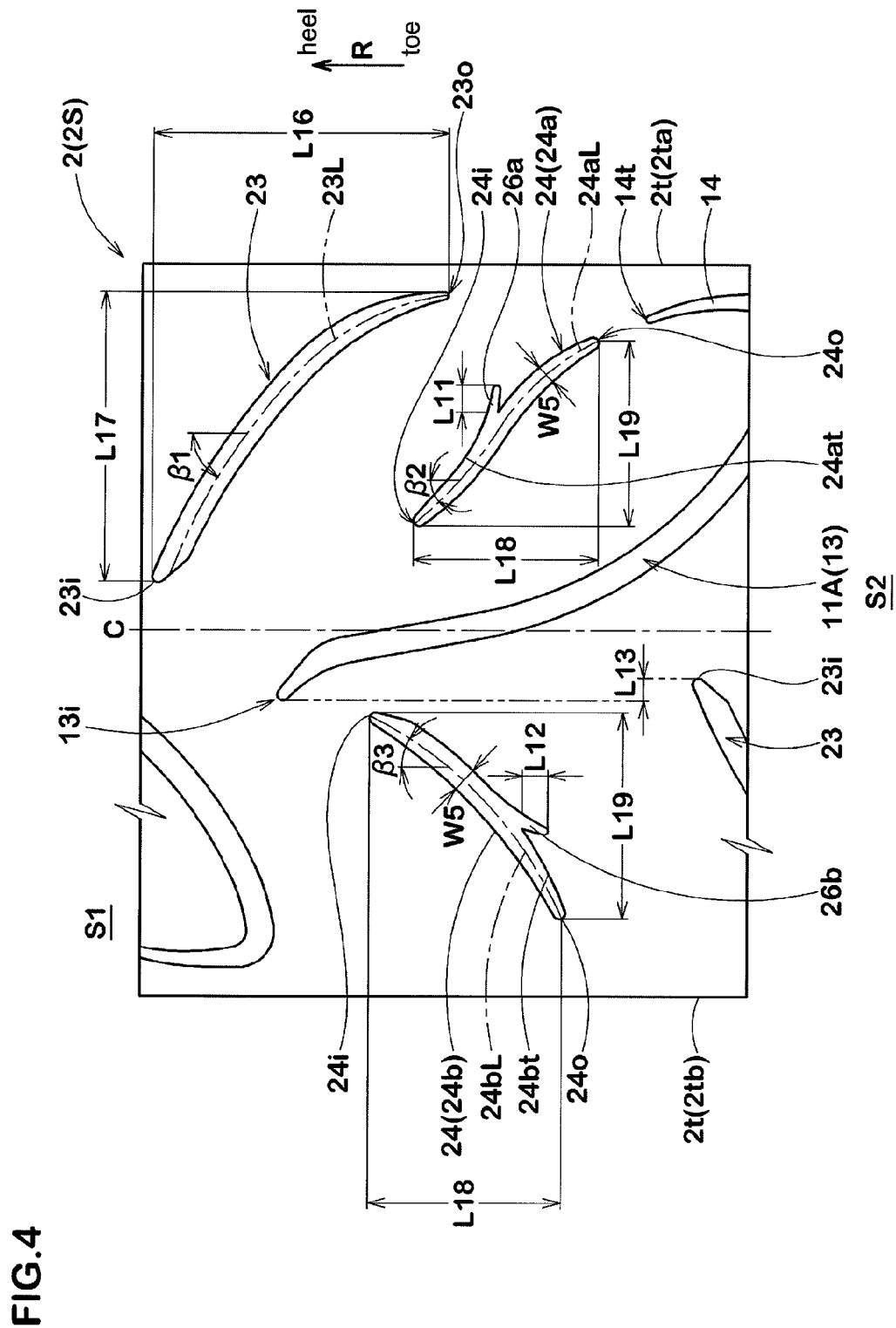
FIG. 4 is a developed partial view of the tread portion showing the auxiliary oblique groove.

As shown in FIG. 2 and FIG. 4, the auxiliary oblique grooves 21 include an inwardly shifted auxiliary oblique groove 23 and an outwardly shifted auxiliary oblique groove 24, wherein the axially inner end 24i of the outwardly shifted auxiliary oblique groove 24 is positioned axially outside the axially inner end 23i of the inwardly shifted auxiliary oblique groove 23.

The angle $\beta1$ of the widthwise center line 23L of the inwardly shifted auxiliary oblique groove 23 with respect to the tire axial direction is set in a range of from 5 to 70 degrees, and the angle $\beta1$ is gradually decreased from the axially inner end 23i to the axially outer end 23o thereof so as to curve toward the direction opposite to the intended tire rotational direction R.

On each side of the tire equator, between the circumferentially adjacent main oblique grooves 11, there are disposed three auxiliary oblique grooves 21 which are one inwardly shifted auxiliary oblique groove 23 and two outwardly shifted auxiliary oblique grooves 24 disposed one on each side of the groove 23 in the tire circumferential direction, wherein the two outwardly shifted auxiliary oblique grooves 24 are first outwardly shifted auxiliary oblique groove 24a and second outwardly shifted auxiliary oblique groove 24b.

The first outwardly shifted auxiliary oblique groove 24a extends towards the heel-side end 14t of the sub portion 14, as shown in FIG. 4. The angle $\beta2$ of the widthwise center line 24aL of the groove 24a with respect to the circumferential direction is gradually increased from its axially inner end to the halfway point of the length thereof, and then gradually decreased from the halfway point to its axially outer end near the heel-side end 14t. Thus, the groove 24a is slightly curved in the form of letter "S". The angle $\beta2$ is set in a range of from 25 to 65 degrees. The first outwardly shifted auxiliary oblique groove 24a is provided on its heel-side edge 24 at with one small branch 26a extending from an intermediate position of the length thereof. The axial length L11 of the branch 26a is set in a range of from 5 to 20 mm.

The second outwardly shifted auxiliary oblique groove 24b inclines toward the direction opposite to the intended tire rotational direction R from its axially inner end 24i to its axially outer end 24o. The angle $\beta3$ of the center line 24bL of the groove 24b with respect to the circumferential direction is gradually increased so as to slightly curved toward the intended tire rotational direction R. The angle $\beta3$ is set in a range of from 25 to 65 degrees. The second outwardly shifted auxiliary oblique groove 24b is also provided on its toe-side edge 24bt with one small branch 26b extending from an intermediate position of the length thereof. The circumferential range L12 of the branch 26b is set in a range of from 5 to 20 mm.

Such auxiliary oblique grooves 21 can improve the drainage performance and also decrease the variation of the tread rigidity in the tire circumferential direction, therefore, the transient characteristic can be improved.

As shown in FIG. 4, the heel-side (axially inner) end 23i of the inwardly shifted auxiliary oblique groove 23 is overlapped with the heel-side end 13i of the main portion 13 of the main oblique groove 11 disposed on the opposite side of the tire equator to the concerned inwardly shifted auxiliary oblique groove 23 in order to improve the drainage and transient characteristic.

Preferably, the axial overlap L13 therebetween is set in a range of not less than 0.1 times, more preferably not less than 0.15 times, but not more than 0.4 times, more preferably not more than 0.35 times one half (W4) of the ground contacting width W3.

The heel-side (axially inner) end 24i of the outwardly shifted auxiliary oblique groove 24 may be overlapped with the heel-side end 13i of the main portion 13 in order to improve the drainage and transient characteristic. But, in this example, they are not overlapped.

The circumferential distance L16 between the ends 23i and 23o of the inwardly shifted auxiliary oblique groove 23 is preferably set in a range of from not less than 0.1 times, more preferably not less than 0.15 times, but not more than 0.4 times, more preferably not more than 0.35 times the circumferential distance L3 between the ends 13i and 13o of the main portion 13. If the circumferential distance L16 is less than 0.1 times the circumferential distance L3, it becomes difficult to fully improve the drainage during cornering. If more than 0.4 times, there is a possibility that the grip performance during cornering is deteriorated.

For similar reasons to the circumferential distance L16, the axial distance L17 between the ends 23i and 23o of the inwardly shifted auxiliary oblique groove 23 is preferably set in a range of from not less than 2.5 times, more preferably not less than 2.7 times, but not more than 4.5 times, more preferably not more than 4.2 times one half (W4) of the ground contacting width W3.

For similar reasons to the inwardly shifted auxiliary oblique groove 23, the circumferential distance L18 between the ends 24i and 24o of the outwardly shifted auxiliary oblique groove 24 is preferably set in a range of from not less than 0.2 times, more preferably not less than 0.25 times, but not more than 0.45 times, more preferably not more than 0.4 times the circumferential distance L3 between the ends 13i and 13o of the main portion 13.

The axial distance L19 between the ends 24i and 24o of the outwardly shifted auxiliary oblique groove 24 is preferably set in a range of from not less than 2.0 times, more preferably not less than 2.25 times, but not more than 3.25 times, more preferably not more than 3.0 times one half (W4) of the ground contacting width W3.

In this example, as explained, all of the tread grooves are not connected with each other.

Preferably, the ends of the main oblique grooves 11 and the ends of the auxiliary oblique grooves 21 are tapered. Thereby, rigidity change around the ends is decreased which helps to improve the rolling resistance.

Comparison Tests

Motorcycle tires having the internal structure shown in FIG. 1 and the tread patterns shown in FIGS. 3, 6, 7 and 8 were prepared and tested as follows.

Figure 6:
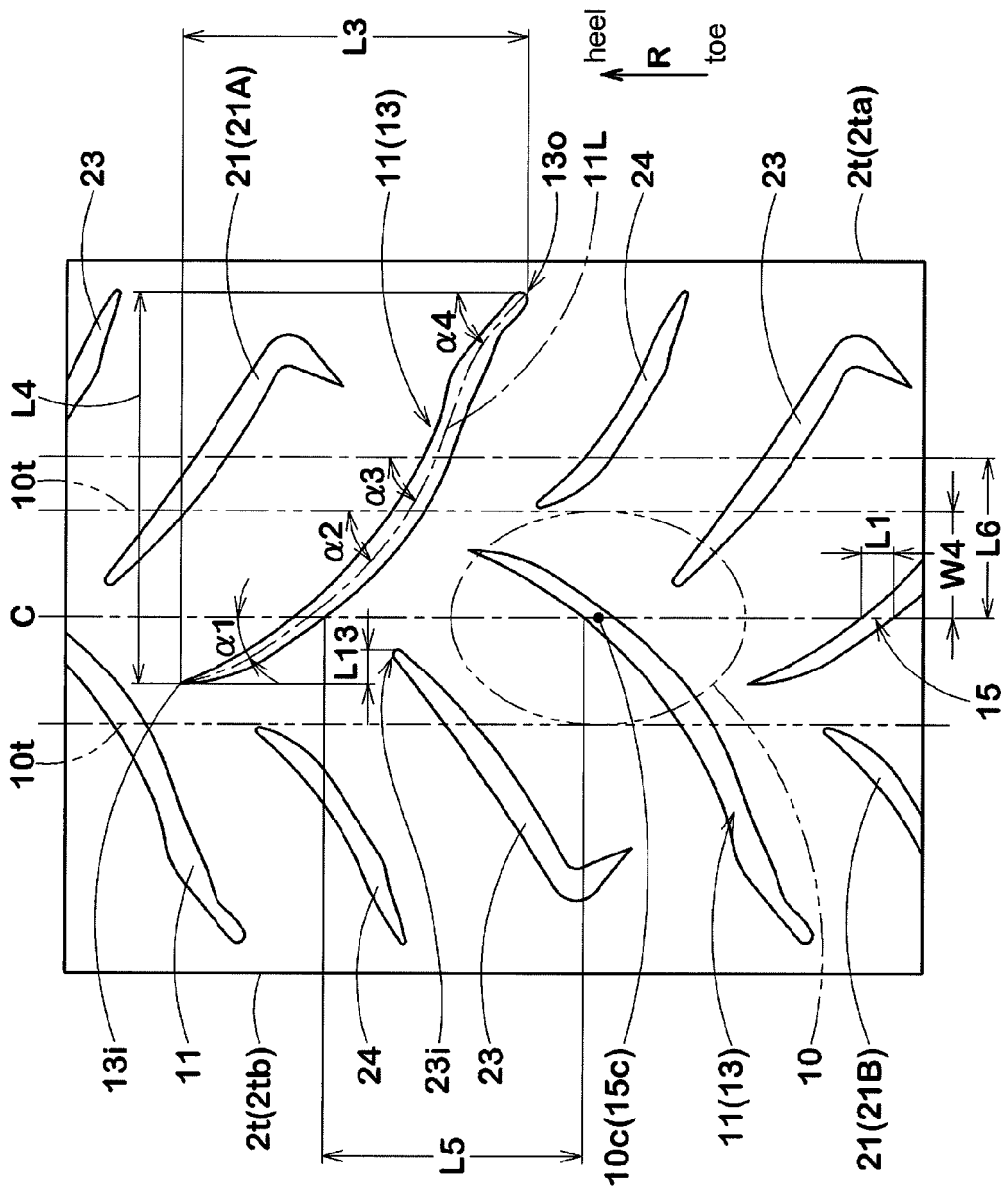
FIG. 6 is a developed partial view of the tread portion of a motorcycle tire as comparative example 1.

In the tread pattern shown in FIG. 6 (comparative example tire Ref. 1), the angle of the main oblique groove with respect to the tire equator was larger than those of the embodiments. In the tread pattern shown in FIG. 7 (comparative example tire Ref. 4), the heel-side end of the main oblique groove was positioned at the tire equator (namely, inside the ground contacting area).

Figure 8:
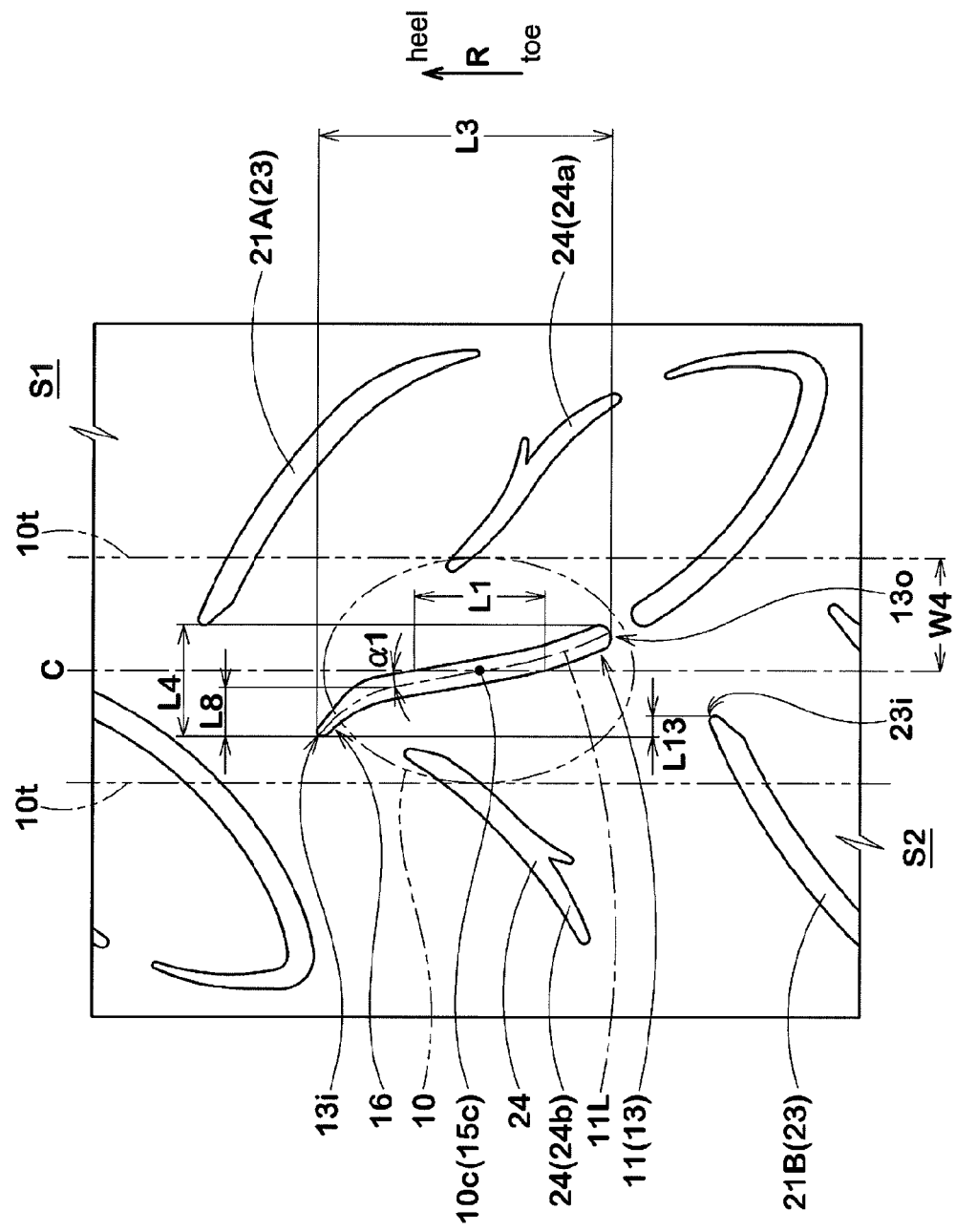
FIG. 8 is a developed partial view of the tread portion of a motorcycle tire as comparative example 5.

In the tread pattern shown in FIG. 8 (comparative example tire Ref. 5), both ends of the main oblique groove were positioned within the ground contacting area.

The specifications of the tread patterns are shown in Table 1.

Common specifications are as follows.
tire size: 180/55ZR17 (rim size: MT5.50×17)
ground contacting area
   maximum circumferential length L2: 98 mm
   ground contacting width W3: 55 mm
   half ground contacting width W4: 27.5 mm
main oblique groove
   maximum groove width W1: 8.2 mm
   maximum groove depth D1: 7.0 mm
   sub portion
      circumferential length L7: 52 mm
      angle $\alpha5$: 0 to 20 degrees auxiliary oblique groove
   maximum groove width W5: 7.6 mm
   maximum groove depth D2: 6.5 mm
   circumferential distance L16: 90 mm
   axial distance L17: 90 mm
   circumferential distance L18: 59 mm
   axial distance L19: 63 mm
   angle β1: 5 to 67 degrees
   angle β2: 25 to 50 degrees
   angle β3: 30 to 65 degrees
   branch length L11: 6.5 mm
   branch length L12: 6.8 mm <Loss Tangent and Complex Elastic Modulus>

The loss tangent and complex elastic modulus were measured by the use of a viscoelastic spectrometer manufactured by Iwamoto seisakusyo K. K. according to 715-K6394 under the following conditions:
   initial strain: 10%
   amplitude: +−2%
   frequency: 10 Hz
   deformation mode: tensile
   measure temperature: 70 deg. C.

<Rolling Resistance>

Using a tire testing drum, the rolling resistance was measured under the following conditions.
   tire pressure: 290 kPa
   tire load: 1.30 kN
   speed: 80 km/h The measured results are indicated in Table 1 by an index based on the comparative example tire Ref. 1 being 100, wherein the larger the value, the better the rolling resistance.

<Ride Comfort, Steering Stability (Transient Characteristic)>

1300 cc motorcycle provided with a test tire inflated to 290 kPa was run on a dry asphalt road surface of a tire test course, and the test rider evaluated the ride comfort and steering stability (transient characteristic).

The results are indicated in Table 1 by an index based on the comparative example tire Ref. 1 being 100, wherein the larger the value, the better the performance.

<Drainage Performance Test (Wet Grip Performance)>

The above-mentioned motorcycle was run on the wet asphalt road surface of the tire test course, and the test rider evaluated the road grip performance.

The results are indicated in Table 1 by an index based on the comparative example tire Ref. 1 being 100, wherein the larger the value, the better the drainage performance.

From the test results, it was confirmed that the motorcycle tires according to the present invention can be improved in the rolling resistance and drainage while maintaining the ride comfort and steering stability.

TABLE 1

| Tire | Ref. 1 | Ex. 1 | Ex. 2 | Ex. 3 | Ref. 2 | Ref. 3 | Ex. 4 | Ex. 5 |
|---|---|---|---|---|---|---|---|---|
| tread pattern | FIG. 6 | FIG. 3 | FIG. 3 | FIG. 3 | FIG. 3 | FIG. 3 | FIG. 3 | FIG. 3 |
| land ratio (%) | 88 | 85 | 85 | 85 | 85 | 70 | 75 | 95 |
| tread rubber | | | | | | | | |
| loss tangent | 0.212 | 0.212 | 0.212 | 0.212 | 0.212 | 0.212 | 0.212 | 0.212 |
| complex elastic modulus (MPa) | 4.13 | 4.13 | 4.13 | 4.13 | 4.13 | 4.13 | 4.13 | 4.13 |
| angle α1 (deg.) | 36 | 0 | 10 | 20 | 30 | 10 | 10 | 10 |
| angle α2 (deg.) | 50 | 36 | 36 | 36 | 36 | 36 | 36 | 36 |
| angle α3 (deg.) | 56 | 46 | 46 | 46 | 46 | 46 | 46 | 46 |
| angle α4 (deg.) | 60 | 95 | 95 | 95 | 95 | 95 | 95 | 95 |
| circumferential range L1 (mm) | 11 | 98 | 41 | 20 | 14 | 75 | 63 | 12 |
| L1/L2 | 0.11 | 1.0 | 0.42 | 0.20 | 0.14 | 0.77 | 0.64 | 0.12 |
| circumferential distance L3 (mm) | 120 | 164 | 164 | 164 | 164 | 164 | 164 | 164 |
| L3/L2 | 1.22 | 1.67 | 1.67 | 1.67 | 1.67 | 1.67 | 1.67 | 1.67 |
| axial length L4 (mm) | 125 | 125 | 125 | 125 | 125 | 125 | 125 | 125 |
| L4/W4 | 4.5 | 4.5 | 4.5 | 4.5 | 4.5 | 4.5 | 4.5 | 4.5 |
| distance L5 (mm) | 87 | 122 | 122 | 122 | 122 | 122 | 122 | 122 |
| L5/L2 | 0.89 | 1.24 | 1.24 | 1.24 | 1.24 | 1.24 | 1.24 | 1.24 |
| axial distance L8 (mm) | — | 4 | 18 | 23 | 27 | 19 | 18 | 14 |
| L8/W4 | — | 0.15 | 0.65 | 0.84 | 0.98 | 0.69 | 0.65 | 0.51 |
| axial overlap L13 (mm) | 11 | −11 | 3 | 8 | 12 | 4 | 3 | −1 |
| L13/W4 | 0.27 | — | 0.11 | 0.29 | 0.44 | 0.15 | 0.11 | — |
| rolling resistance | 100 | 105 | 103 | 101 | 99 | 99 | 102 | 101 |
| drainage | 100 | 105 | 103 | 102 | 100 | 106 | 105 | 101 |
| ride comfort | 100 | 101 | 102 | 101 | 100 | 97 | 98 | 98 |
| steering stability | 100 | 98 | 100 | 101 | 101 | 95 | 98 | 101 |

Figure 7:
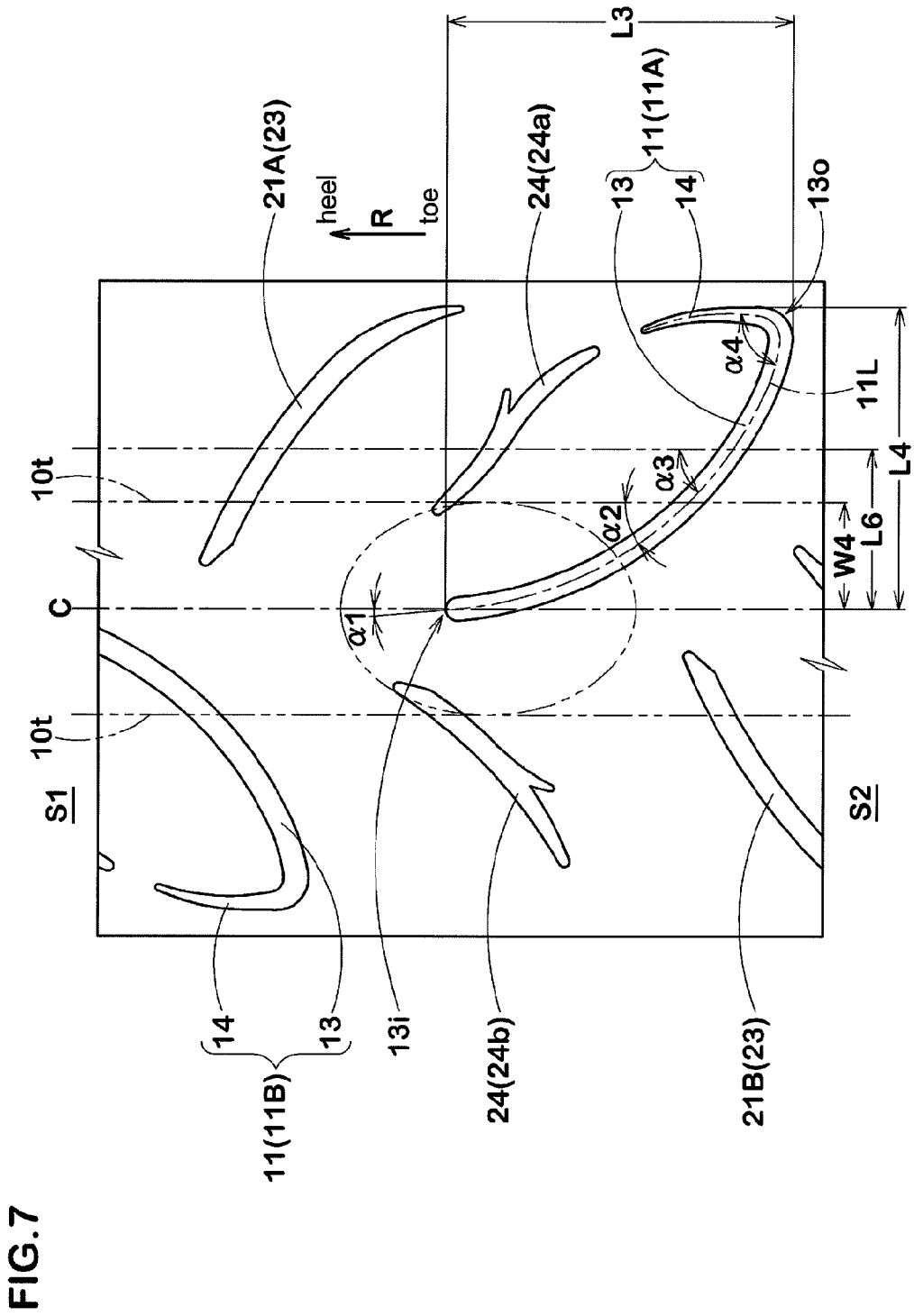
FIG. 7 is a developed partial view of the tread portion of a motorcycle tire as comparative example 4.

| Tire | Ref. 4 | Ex. 6 | Ex. 7 | Ref. 5 | Ex. 8 | Ex. 9 | Ex. 10 |
|---|---|---|---|---|---|---|---|
| tread pattern | FIG. 7 | FIG. 3 | FIG. 3 | FIG. 8 | FIG. 3 | FIG. 3 | FIG. 3 |
| land ratio (%) | 85 | 85 | 85 | 85 | 85 | 85 | 85 |
| tread rubber | | | | | | | |
| loss tangent | 0.212 | 0.212 | 0.212 | 0.212 | 0.212 | 0.212 | 0.212 |
| complex elastic modulus (MPa) | 4.13 | 4.13 | 4.13 | 4.13 | 4.13 | 4.13 | 4.13 |
| angle α1 (deg.) | 10 | 10 | 10 | 10 | 10 | 10 | 10 |
| angle α2 (deg.) | 36 | 36 | 36 | — | 36 | 36 | 36 |
| angle α3 (deg.) | 46 | 46 | 46 | — | 46 | 46 | 46 |
| angle α4 (deg.) | 95 | 95 | 95 | — | 95 | 95 | 95 |
| circumferential range L1 (mm) | 20 | 40 | 90 | 41 | 41 | 41 | 41 |
| L1/L2 | 0.20 | 0.41 | 0.92 | 0.42 | 0.42 | 0.42 | 0.42 |
| circumferential distance L3 (mm) | 112 | 150 | 164 | 55 | 85 | 98 | 164 |
| L3/L2 | 1.14 | 1.53 | 1.67 | 0.56 | 0.87 | 1.00 | 1.67 |
| axial length L4 (mm) | 104 | 110 | 120 | 50 | 70 | 80 | 125 |
| L4/W4 | 3.78 | 4.0 | 4.36 | 1.82 | 2.55 | 2.91 | 4.5 |

TABLE 1-continued

| | | | | | | | |
|---|---|---|---|---|---|---|---|
| distance L5 (mm) | 122 | 122 | 122 | 122 | 122 | 122 | 90 |
| L5/L2 | 1.24 | 1.24 | 1.24 | 1.24 | 1.24 | 1.24 | 0.92 |
| axial distance L8 (mm) | — | 10 | 10 | 18 | 18 | 18 | 18 |
| L8/W4 | — | 0.36 | 0.36 | 0.65 | 0.65 | 0.65 | 0.65 |
| axial overlap L13 (mm) | −3 | −3 | −3 | 3 | 3 | 3 | 3 |
| L13/W4 | — | — | — | 0.11 | 0.11 | 0.11 | 0.11 |
| rolling resistance | 100 | 101 | 102 | 103 | 103 | 103 | 104 |
| drainage | 98 | 101 | 102 | 95 | 97 | 98 | 104 |
| ride comfort | 100 | 101 | 99 | 100 | 100 | 101 | 100 |
| steering stability | 100 | 100 | 99 | 99 | 100 | 100 | 98 |

| Tire | Ex. 11 | Ex. 12 | Ex. 13 | Ex. 14 | Ex. 15 | Ex. 16 | Ex. 17 | Ex. 18 |
|---|---|---|---|---|---|---|---|---|
| tread pattern | FIG. 3 | FIG. 3 | FIG. 3 | FIG. 3 | FIG. 3 | FIG. 3 | FIG. 3 | FIG. 3 |
| land ratio (%) | 85 | 85 | 85 | 85 | 85 | 85 | 85 | 85 |
| tread rubber | | | | | | | | |
| loss tangent | 0.212 | 0.212 | 0.212 | 0.212 | 0.212 | 0.212 | 0.212 | 0.18 |
| complex elastic modulus (MPa) | 4.13 | 4.13 | 4.13 | 4.13 | 4.13 | 4.13 | 4.13 | 4.50 |
| angle α1 (deg.) | 10 | 10 | 10 | 10 | 10 | 10 | 10 | 10 |
| angle α2 (deg.) | 36 | 20 | 45 | 36 | 36 | 36 | 36 | 36 |
| angle α3 (deg.) | 46 | 30 | 60 | 46 | 46 | 46 | 46 | 46 |
| angle α4 (deg.) | 95 | 60 | 120 | 95 | 95 | 95 | 95 | 95 |
| circumferential range L1 (mm) | 41 | 41 | 41 | 41 | 41 | 41 | 41 | 41 |
| L1/L2 | 0.42 | 0.42 | 0.42 | 0.42 | 0.42 | 0.42 | 0.42 | 0.42 |
| circumferential distance L3 (mm) | 164 | 164 | 164 | 164 | 164 | 164 | 164 | 164 |
| L3/L2 | 1.67 | 1.67 | 1.67 | 1.67 | 1.67 | 1.67 | 1.67 | 1.67 |
| axial length L4 (mm) | 125 | 125 | 125 | 125 | 125 | 125 | 125 | 125 |
| L4/W4 | 4.5 | 4.5 | 4.5 | 4.5 | 4.5 | 4.5 | 4.5 | 4.5 |
| distance L5 (mm) | 150 | 122 | 122 | 122 | 122 | 122 | 122 | 122 |
| L5/L2 | 1.5 | 1.24 | 1.24 | 1.24 | 1.24 | 1.24 | 1.24 | 1.24 |
| axial distance L8 (mm) | 18 | 18 | 18 | 15 | 25 | 18 | 18 | 18 |
| L8/W4 | 0.65 | 0.66 | 0.66 | 0.55 | 0.91 | 0.66 | 0.66 | 0.66 |
| axial overlap L13 (mm) | 3 | 3 | 3 | 3 | 3 | 0 | 15 | 3 |
| L13/W4 | 0.11 | 0.11 | 0.11 | 0.11 | 0.11 | 0 | 0.55 | 0.11 |
| rolling resistance | 101 | 103 | 103 | 101 | 103 | 103 | 103 | 101 |
| drainage | 100 | 103 | 103 | 101 | 103 | 102 | 102 | 103 |
| ride comfort | 100 | 101 | 101 | 102 | 100 | 102 | 102 | 101 |
| steering stability | 100 | 98 | 98 | 100 | 98 | 100 | 99 | 98 |

The invention claimed is:

1. A motorcycle tire having an intended rotational direction and comprising a tread portion having a pair of tread edges and provided on each side of the tire equator with main oblique grooves, wherein each said main oblique groove comprises a main portion extending from the tire equator toward one of the tread edges while inclining to the direction opposite to the intended rotational direction, the main portion further extending over the tire equator toward the other tread edge so that the main portion includes a part extending in a circumferential direction at an inclination angle of not more than 20 degrees with respect to the tire equator while overlapping the tire equator, the main portion has such a dimension that the circumferential ends thereof are positioned outside a ground contacting area of the tire in a normally inflated loaded state of the tire at a camber angle of zero degrees when the circumferential center of the maximum circumferential length of said ground contacting area coincides with the center of the circumferential range of a part of the tire equator overlapping the main portion, wherein the circumferential range is in a range of from 0.4 to 1.0 times the maximum circumferential length of said ground contacting area, and the tread portion is provided between the ground contact edges with a land ratio of from 75 to 95%, wherein the ground contact edges are the axially outermost edges of the ground contacting area.

2. The motorcycle tire according to claim 1, wherein in the tire circumferential direction, the main oblique grooves on one side of the tire equator alternate with the main oblique grooves on the other side of the tire equator.

3. The motorcycle tire according to claim 1, wherein the circumferential distance between both ends of the main portion is in a range of from 0.8 to 2.0 times the maximum circumferential length of the ground contacting area.

4. The motorcycle tire according to claim 1, wherein the angle of the widthwise center line of the main portions with respect to the circumferential direction gradually increase from the tire equator to at least said ground contact edge, and the angle at the ground contact edge is in a range of from 30 to 60 degrees.

5. The motorcycle tire according to claim 1, wherein the main portion extends from the tire equator axially outwardly beyond said ground contact edge, while gradually increasing its angle with respect to the circumferential direction.

6. The motorcycle tire according to claim 1, wherein the angle of widthwise center line of the main portion with respect to the circumferential direction is in a range of from 30 to 70 degrees when measured at a position spaced apart from the tire equator by a distance of 0.75 times a ground contacting width defined between said ground contact edges.

7. The motorcycle tire according to claim 1, wherein the distance between the circumferentially adjacent main oblique grooves measured at the tire equator is in a range of from 0.9 to 1.5 times the maximum circumferential length of said ground contacting area.

8. A motorcycle tire having an intended rotational direction and comprising a tread portion having a pair of tread edges and provided on each side of the tire equator with main oblique grooves, wherein each said main oblique groove comprises a main portion extending from the tire equator toward one of the tread edges while inclining to the direction opposite to the intended rotational direction, and a sub portion extending in the tire circumferential direction from a toe-side end of the main portion toward the intended tire rotational direction, the main portion includes a part overlapping the tire equator which part has an inclination angle of not more than 20 degrees with respect to the tire equator, the main portion has such a dimension that the circumferential ends thereof are positioned outside a ground contacting area of the tire in a normally inflated loaded state of the tire at a camber angle of zero degrees when the circumferential center of the maximum circumferential length of said ground contacting area coincides with the center of the circumferential range of a part of the tire equator overlapping the main portion, and the tread portion is provided between the ground contact edges with a land ratio of from 75 to 95%, wherein the ground contact edges are the axially outermost edges of the ground contacting area.

9. A motorcycle tire having an intended rotational direction and comprising a tread portion having a pair of tread edges and provided on each side of the tire equator with main oblique grooves, wherein each said main oblique groove comprises a main portion extending from the tire equator toward one of the tread edges while inclining to the direction opposite to the intended rotational direction, the main portion includes a part overlapping the tire equator which part has an inclination angle of not more than 20 degrees with respect to the tire equator, the main portion has such a dimension that the circumferential ends thereof are positioned outside a ground contacting area of the tire in a normally inflated loaded state of the tire at a camber angle of zero degrees when the circumferential center of the maximum circumferential length of said ground contacting area coincides with the center of the circumferential range of a part of the tire equator overlapping the main portion, and the tread portion is provided between the ground contact edges with a land ratio of from 75 to 95%, wherein the ground contact edges are the axially outermost edges of the ground contacting area, and wherein the tread portion is provided on each side of the tire equator with auxiliary oblique grooves not overlapping with the tire equator, the auxiliary oblique grooves are inclined toward the direction opposite to the intended tire rotational direction from its axially inner end to its axially outer end, the auxiliary oblique grooves include an inwardly shifted auxiliary oblique groove which is disposed on one side of the tire equator and whose heel-side end overlaps in the tire axial direction with the heel-side end of the main oblique groove on the other side of the tire equator.

10. The motorcycle tire according to claim 9, wherein the axial overlap between said heel-side end of the inwardly shifted auxiliary oblique groove and said heel-side end of the main oblique groove is in a range of from 0.05 to 0.2 times the ground contacting width between said ground contact edges.

11. The motorcycle tire according to claim 9, wherein the auxiliary oblique grooves are 1st auxiliary oblique grooves extending toward one tread edge and 2nd auxiliary oblique grooves extending toward the other tread edge which are alternately arranged in the tire circumferential direction.

12. The motorcycle tire according to claim 10, wherein the auxiliary oblique grooves are 1st auxiliary oblique grooves extending toward one tread edge and 2nd auxiliary oblique grooves extending toward the other tread edge which are alternately arranged in the tire circumferential direction.

* * * * *